Sept. 1, 1931.  A. F. GODEFROY  1,821,057
MEANS AND METHOD FOR LOADING AIRCRAFT
Filed Jan. 13, 1931
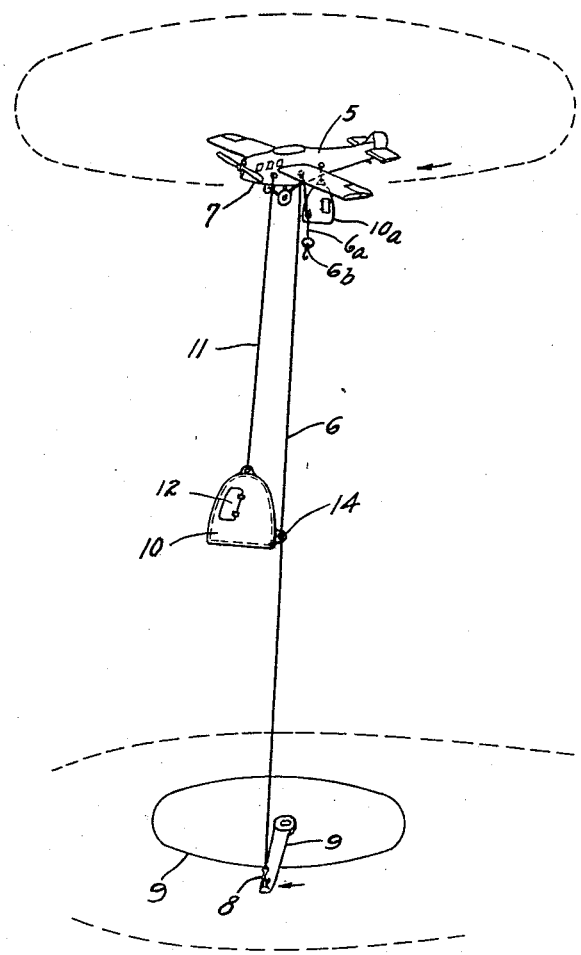
INVENTOR.
Alexandre F. Godefroy
BY Robt. W. Pearson
ATTORNEYS.

Patented Sept. 1, 1931

1,821,057

UNITED STATES PATENT OFFICE

ALEXANDRE F. GODEFROY, OF LOS ANGELES, CALIFORNIA

MEANS AND METHOD FOR LOADING AIRCRAFT

Application filed January 13, 1931. Serial No. 508,418.

This invention relates to a means and method for loading aircraft with passengers and freight while the craft is in flight.

Object of the invention is to provide a simple and safe method and apparatus for loading aircraft, more particularly airplanes, from the ground without the necessity of the air plane effecting a landing before freight and passengers are placed on board.

Another object of the invention is to provide means for safely loading and unloading airplanes in situations where there is not sufficient room to provide the length of smooth surface necessary to effect a safe landing.

Another object of the invention is to save time by loading airplanes quickly while in flight without the necessity of expending the amount of time required for landing and again taking to the air.

The figure is a perspective, somewhat diagrammatic, view illustrating the method and apparatus in use to load and to unload an airplane which is shown in flight.

Referring in detail to the drawing, the airplane 5 is shown provided with a guide line 6 which has been dropped from the airplane the upper end of said guide line being shown attached to fuselage at 7, and the lower end of said guide cord 6 being shown attached at 8 to a revolving table 9. As indicated by the upper and lower arrows in the view, the airplane 5 is traveling in a circular direction and the table 9 is being rotated in the same direction, the orbital path of the airplane being about the same vertical axis as the axis of rotation of the table 9.

A carriage 10 is shown suspended from the airplane by means of a cable 11, said carriage having a door 12 to provide for loading thereinto and unloading therefrom freight and passengers. Said carriage 10 is also provided with a guide extension 14 through which passes the guide line 6 and by which said carriage is guided in its movements while being raised from the table 9 to the airplane and while being lowered from the airplane to said table.

From what has already been said regarding the use of the device to load passengers from the table 9 on to the airplane while the latter is in flight, it will be seen that the carriage 10 may also be used, during flight, to convey passengers from the airplane to the carrier for said carriage which is afforded by the revolving table in unloading the passengers, after the guide line has been dropped and its lower end secured to the table 9 near the periphery of said table, a carriage 10 which is suspended from or housed within the airplane, will be loaded with passengers or freight and then let down under the guidance of the guide line 6 till it reaches the revolving table 9, it being understood that the airplane will in the meantime be flying through as small a circle as possible directly above said table and in the same direction as the rotation thereof.

A suitable reel or windlass (not shown) will be mounted upon the airplane and operated either by hand or by the engine of the airplane to unreel or wind up the connections 6 and 11, as required.

The revolvable table 9 may be mounted upon a building having a flat roof, or upon the ground, or in any other convenient situation. It may not be practicable to make the revolving table so large that its diameter will be equal to the diameter of the smallest circular path of flight possible for the airplane, but by making said table as large as conveniently possible it will greatly aid, when rotated as stated, in the loading and unloading operations which have been described.

In the drawing a second carriage 10a is shown by dotted lines suspended from the airplane and also a second guide line 6a shown having a weight 6b attached to its lower end to cause it to fall is a more dependable manner when lowered to table 9.

The device may also be used to transfer passengers to and from an upper to a lower airplane while both of said planes are in flight, one vertically above the other.

Claims:

1. A method for loading aircraft which consists in providing an airplane with a conveyor adapted to be carried thereby, furnishing to said airplane a suspending cable and a guide line for said conveyor, lowering one end of said guide line to the ground, then anchoring the lower end of said guide line to a carrier which is adapted to travel in a circle, then putting said carrier into motion in a circle in the same direction that the airplane is circling, then by means of the aforesaid cable and guide line lowering said conveyor from said airplane to said carrier.

2. A method for loading aircraft which consists in providing an airplane with a drop line and with a cable, causing said airplane to travel in a circular path, to the ground, anchoring the lower end of said guide line to a rotary carrier, mounting upon said carrier a carriage, securing to said carriage the lower end of said cable, putting said carrier into motion by means of said carriage in a circular path, the direction of movement of said carrier and carriage being the same as the direction of movement of the airplane, and then hoisting said carriage to the airplane by means of said cable under the guidance of said guide line while both the airplane and the carrier are moving in a circular path, as aforesaid.

In testimony whereof I hereunto affix my signature.

ALEXANDRE F. GODEFROY.